United States Patent
Hirata (10) Patent No.: US 10,379,411 B2
(45) Date of Patent: Aug. 13, 2019

(54) LIQUID CRYSTAL DISPLAY PANEL AND LIQUID CRYSTAL DISPLAY DEVICE

(71) Applicant: Mitsubishi Electric Corporation, Tokyo (JP)

(72) Inventor: Naoya Hirata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 2 days.

(21) Appl. No.: 15/730,004

(22) Filed: Oct. 11, 2017

(65) Prior Publication Data

US 2018/0107084 A1 Apr. 19, 2018

(30) Foreign Application Priority Data

Oct. 13, 2016 (JP) .................................. 2016-201447

(51) Int. Cl.
*G02F 1/1333* (2006.01)
*G02F 1/1339* (2006.01)
(Continued)

(52) U.S. Cl.
CPC .......... *G02F 1/1345* (2013.01); *G02F 1/1339* (2013.01); *G02F 1/1368* (2013.01);
(Continued)

(58) Field of Classification Search
CPC ............. G02F 1/136286; G02F 1/1339; G02F 1/1368; G02F 2201/121; G02F 2001/133357; G02F 2201/123; G02F 2201/56; G02F 1/13439; G02F 1/1362; G02F 1/136209; G02F 1/136227; G02F 1/1365; G02F 2001/136218; G02F 2001/136222; G02F 2001/136231; G02F 2001/13625; G02F 2001/1635; G02F 2202/10; G02F 1/1333; G02F 1/133305;
(Continued)

(56) References Cited

U.S. PATENT DOCUMENTS

2009/0102824 A1* 4/2009 Tanaka ............... G02F 1/134309
345/205
2009/0174856 A1* 7/2009 Aoki ..................... G02F 1/1345
349/153
(Continued)

FOREIGN PATENT DOCUMENTS

JP 2010-243875 A 10/2010

*Primary Examiner* — Shan Liu
(74) *Attorney, Agent, or Firm* — Studebaker & Brackett PC (57) ABSTRACT

A liquid crystal display panel is provided with a TFT array substrate serving as a first substrate and a CF substrate serving as a second substrate, which are disposed to face each other, and liquid crystal sealed between the TFT array substrate and the CF substrate. The TFT array substrate includes an insulating substrate, a plurality of gate lines, a plurality of source lines, TFTs serving as switching elements, a non-rectangular display region having a non-rectangular shape formation part, and a common line. A plurality of pixels is arrayed in a stepped pattern at the non-rectangular shape formation part of the display region, and a portion of the common line corresponding to the non-rectangular shape formation part of the display region is formed into a shape following the plurality of pixels arrayed in a stepped pattern.

16 Claims, 10 Drawing Sheets

(51) Int. Cl.
*G02F 1/1345* (2006.01)
*G02F 1/1362* (2006.01)
*G02F 1/1368* (2006.01)

(52) U.S. Cl.
CPC .............. *G02F 1/136286* (2013.01); *G02F 2001/133357* (2013.01); *G02F 2201/121* (2013.01); *G02F 2201/123* (2013.01); *G02F 2201/56* (2013.01)

(58) Field of Classification Search
CPC ... G02F 1/136277; G02F 2001/133302; G02F 2001/133368; G02F 2001/133354; G02F 1/0121; G02F 1/0327; G02F 1/076; G02F 1/133; G02F 1/13306; G02F 1/1345; G02F 1/13452; G02F 1/13454; G02F 1/13458; G02F 2001/133388; G02F 2001/133612; G02F 2001/13456; G02F 1/1343; G02F 1/134309; G02F 1/155; G02F 1/1393; G02F 1/1395; G02F 1/136; G02F 1/218; G02F 1/134363; G02F 1/134327; G02F 1/133707; G02F 1/134336; G02F 1/0316; G02F 2001/134318; G02F 2001/134372; G02F 2001/134381; G02F 2001/134345; G02F 2001/1357; G02F 2001/136295; G02F 2001/1552; G02F 2001/1555; G02F 2001/1557; G02F 2001/13629; G02F 2201/12; G02F 2201/124; G02F 2201/122; G02F 2201/14; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508; H01L 27/12; H01L 27/1203; H01L 27/1218; H01L 21/02367; H01L 23/48; H01L 23/49572; H01L 2224/50; H01L 2224/79; H01L 2224/86; H01L 2225/06579; H01L 2225/107; H01L 24/50; H01L 27/124; H01L 27/3276; H01L 27/3297; H01L 27/3279; H01L 27/329; H01L 23/49534; H01L 2933/0016; G09G 2300/0426; G09G 2300/0408; G09G 3/3655; G09G 3/3674; G09G 3/3685; G09G 2290/00; G09G 2320/0223; G09G 2300/0421; G09G 3/36; G09G 2300/0439; G09G 3/3659
USPC .......................... 349/42–43, 158, 139–152
See application file for complete search history.

(56) References Cited

U.S. PATENT DOCUMENTS

| | | | |
|---|---|---|---|
| 2012/0001835 A1* | 1/2012 | Yamamoto | G02F 1/13454 345/55 |
| 2012/0007089 A1* | 1/2012 | Tanahara | G02F 1/136213 257/59 |
| 2016/0225308 A1* | 8/2016 | Baek | G09G 3/2022 |
| 2016/0314753 A1* | 10/2016 | Tomikawa | G09G 3/3614 |
| 2017/0184935 A1* | 6/2017 | Park | G02F 1/136286 |
| 2017/0205668 A1* | 7/2017 | Kim | G02F 1/133788 |
| 2017/0351152 A1* | 12/2017 | Hashiguchi | G02F 1/134363 |
| 2018/0088400 A1* | 3/2018 | Liu | G02F 1/133512 |

* cited by examiner

LIQUID CRYSTAL DISPLAY PANEL AND LIQUID CRYSTAL DISPLAY DEVICE

BACKGROUND OF THE INVENTION

Field of the Invention

The present invention relates to a liquid crystal display panel and a liquid crystal display device having a display region of a non-rectangular shape such as a circle, an ellipse, or a polygon other than a rectangle.

Description of the Background Art

Recently, thin flat display panels employing a theory of liquid crystal, electroluminescence, or the like have been often used as display devices. A liquid crystal display device which represents the display devices has features of not only being thin and light-weight but also being capable of being driven at a low voltage.

Particularly, a thin film transistor (TFT) liquid crystal display device is provided with a TFT serving as a switching element in each pixel on an array substrate, and each pixel can individually retain a voltage for driving a liquid crystal layer. Therefore, the TFT liquid crystal display device can achieve the display of high quality with less crosstalk. In addition, each pixel is provided with a gate line serving as a scanning line for controlling on/off of the thin film transistor (hereinafter referred to as a "TFT") and a source line serving as a signal line for inputting image data. Each pixel is typically formed in an area surrounded by the gate line and the source line.

The feature of the liquid crystal display device is a liquid crystal layer being formed between two substrates. One of the two substrates is a TFT array substrate having a plurality of pixels being arrayed in a matrix to form a display region, and the other is a color filter substrate (hereinafter referred to as a "CF substrate").

Recently, as the thin display device becomes mainstream, the function and shape of a product to be required has been diversified. Regarding the shape of the display region, there is a demand for a thin display device having not a conventional display region of a rectangular shape such as a square or oblong shape but a display region of a variety of non-rectangular shapes such as a circle, an ellipse, or a polygon other than a rectangle. Examples of the display device which is required to be thin include a mobile terminal display device and a vehicle-mounted display device.

A display region having a non-rectangular shape has approximately a circular shape, an elliptical shape, or a polygonal shape other than a rectangle, whereas the pixels are not actually arrayed in a circle or other shapes at a non-rectangular shape formation part of the display region. Specifically, because the display region of the liquid crystal display device is formed by a plurality of rectangular pixels, the pixels at the non-rectangular shape formation part are arrayed in a stepped pattern, and a light-shielding layer provided on the CF substrate side is similarly formed in a stepped pattern (for example, see Japanese Patent Application Laid-Open No. 2010-243875).

In the liquid crystal display device, a common line is disposed on the peripheral portion of the display region to supply a common potential to the pixels. If the display region is rectangular, the common line and the pixels both have a rectilinear perimeter, so that there is a little gap between the common line and pixel lines.

On the other hand, if the display region is non-rectangular, the pixels at the non-rectangular shape formation part are arrayed in a stepped pattern, and therefore, a gap between the pixels and the common line is increased. This results in an increase in a region where no metal pattern is present, which increases an effect caused by light leakage. Generally, a black matrix (BM) for shielding light is disposed on the CF substrate side outside the display region, by which light from a backlight is shielded. However, if there is no light-shielding pattern for shielding light, such as a metal film, on the peripheral portion of the display region on the TFT array substrate side, there arises a problem of light leakage from the peripheral portion of the display region.

SUMMARY OF THE INVENTION

The present invention aims to provide a liquid crystal display panel and a liquid crystal display device that can provide satisfactory display by suppressing light leakage from a peripheral portion of the display region.

A liquid crystal display panel according to the present invention includes a first substrate and a second substrate which are disposed to face each other, and liquid crystal sealed between the first substrate and the second substrate. The first substrate includes an insulating substrate, a plurality of gate lines, a plurality of source lines, switching elements, a non-rectangular display region, and a common line. The plurality of gate lines is disposed on the insulating substrate. The plurality of source lines is provided on the insulating substrate so as to intersect the gate lines. The switching element is disposed in each of peripheral regions of intersections of the gate lines and the source lines. The display region has a plurality of pixels arrayed in matrices defined by the gate lines and the source lines, and has a non-rectangular shape formation part. The common line is disposed in a peripheral region of the display region, and supplies a common potential to a plurality of pixels. At the non-rectangular shape formation part of the display region, the plurality of pixels is arrayed in a stepped pattern, and a portion of the common line corresponding to the non-rectangular shape formation part of the display region is formed into a shape following the plurality of pixels arrayed in a stepped pattern.

The plurality of pixels is arrayed in a stepped pattern at the non-rectangular shape formation part of the display region, and the portion of the common line corresponding to the non-rectangular shape formation part of the display region is formed into a shape following the plurality of pixels arrayed in a stepped pattern.

Therefore, a gap between the pixels and the common line can be eliminated at the non-rectangular shape formation part of the display region, whereby leakage of light from the peripheral portion of the display region can be suppressed. Thus, a liquid crystal display panel that provides satisfactory display can be implemented.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
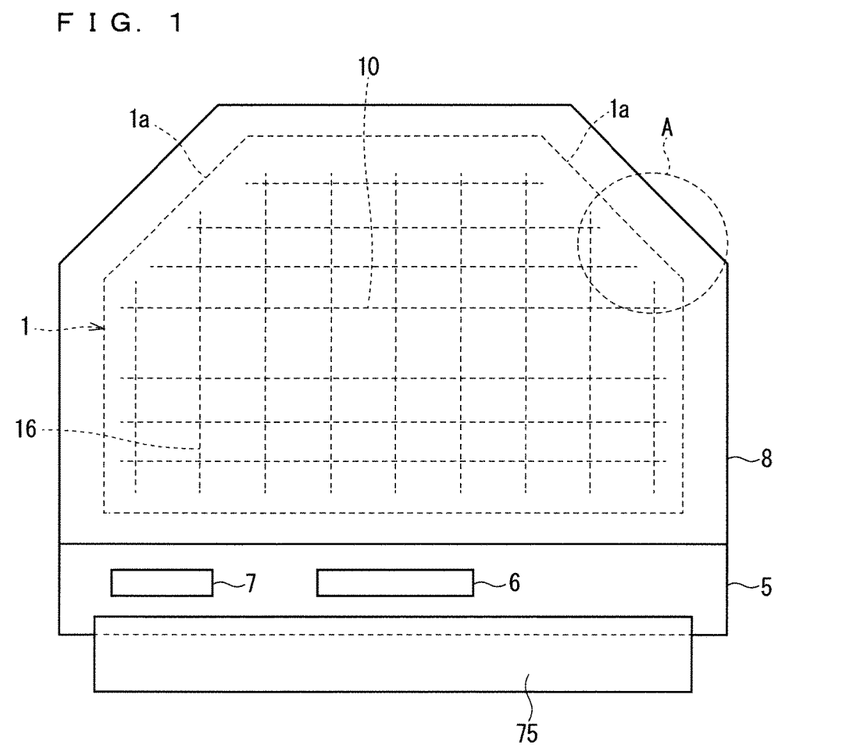
FIG. 1 is a plan view of a liquid crystal display panel according to a first preferred embodiment.
Figure 2:
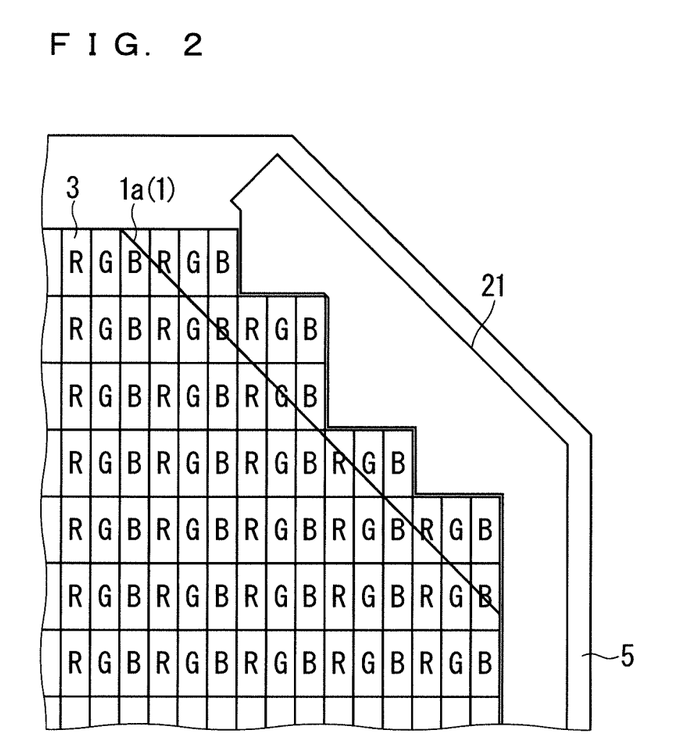
FIG. 2 is an enlarged plan view of a region A in FIG. 1.

The first preferred embodiment of the present invention will be described below with reference to the drawings. FIG. 1 is a plan view of a liquid crystal display panel according to the first preferred embodiment. FIG. 2 is an enlarged plan view of a region A in FIG. 1.

The liquid crystal display panel is used for a liquid crystal display device. The liquid crystal display device is provided with a backlight (not illustrated) serving as a light source device, and a liquid crystal display panel disposed on an emission surface side of the backlight.

As illustrated in FIG. 1, the liquid crystal display panel includes a TFT array substrate 5 serving as a first substrate, a CF substrate 8 serving as a second substrate, and liquid crystal (not illustrated). The TFT array substrate 5 and the CF substrate 8 are disposed to face each other, and the liquid crystal is sealed between the TFT array substrate 5 and the CF substrate 8. The TFT array substrate 5 is provided with an insulating substrate 9 (see FIG. 4), a plurality of gate lines 10, a plurality of source lines 16, TFTs 40 (see FIG. 3), a display region 1, and a common line 21.

A substrate having permeability, such as a glass substrate or a quartz substrate, is used for the insulating substrate 9. A plurality of gate lines 10 extending in the horizontal direction of the sheet surface of FIG. 1 is provided on the insulating substrate 9. A plurality of source lines 16 extending in the vertical direction of the sheet surface of FIG. 1 is provided on the insulating substrate 9 so as to intersect the gate lines 10. A TFT 40 serving as a switching element is provided in each of peripheral regions of the intersections between the gate liens 10 and the source lines 16. Note that the gate lines 10 and the source lines 16 intersect each other through an insulating film as described later.

As illustrated in FIGS. 1 and 2, the display region 1 is formed into a non-rectangular shape such as a hexagonal shape, and the TFT array substrate 5 and the CF substrate 8 are also formed into a non-rectangular shape such as a hexagonal shape. A plurality of pixels 3 which is a unit of displaying an image is arrayed in the display region 1 in matrices defined by the gate lines 10 and the source lines 16. Each of the pixels 3 is provided with the TFT 40 (see FIG. 3) serving as a switching element for supplying a display voltage to a pixel electrode. That is, the TFTs 40 are disposed on the TFT array substrate 5 in an array for the respective pixels 3. Note that the CF substrate 8 is not illustrated in FIG. 2 to facilitate visibility.

A source driver IC 6 and a gate driver IC 7 are disposed in a region outside the display region 1 on the TFT array substrate 5, more specifically, below the display region 1 in the sheet surface of FIG. 1. The source driver IC 6 and the gate driver IC 7 are connected to the source lines 16 and the gate lines 10, respectively. An FPC 75 is mounted in the region outside the display region 1 on the TFT array substrate 5, more specifically, below the source driver IC 6 and the gate driver IC 7 in the sheet surface of FIG. 1. The FPC 75 is connected to the common line 21 for supplying a common potential to the common line 21.

The common line 21 for supplying a common potential to the plurality of pixels 3 is disposed in the peripheral region of the display region 1. The common line 21 is formed from a metal film. A common potential is supplied to the pixels 3 from the common line 21 through a metal line or a transparent electrode formed from ITO or the like, and in the pixels 3, a common potential is also supplied through a metal line or a transparent electrode formed from ITO or the like. The transparent electrode herein means a pixel electrode 17 and a common electrode 19 described later.

Figure 10:
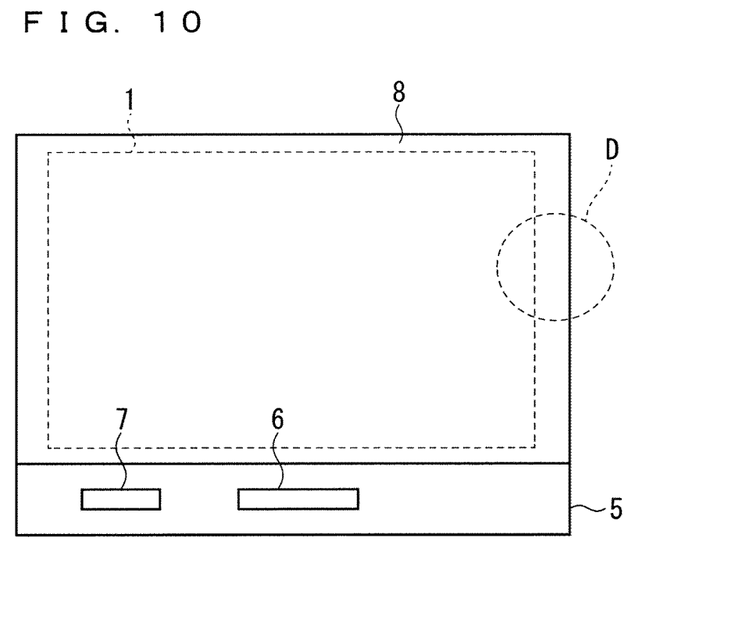
FIG. 10 is a plan view of the liquid crystal display panel having a rectangular display region.
Figure 11:
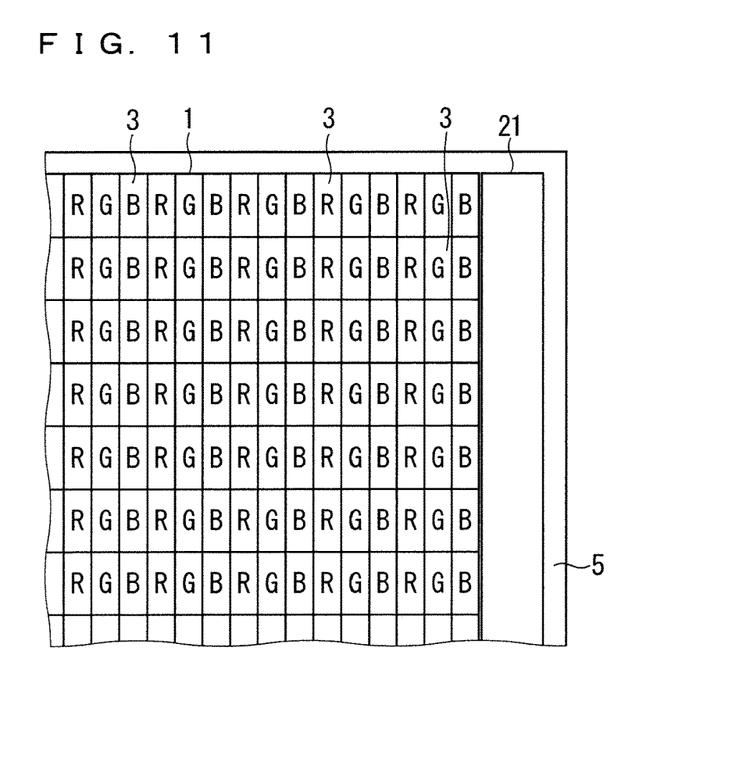
FIG. 11 is an enlarged plan view of a region D in FIG. 10.

As illustrated in FIGS. 10 and 11, if the display region 1 is formed into a rectangular shape, a light-shielding pattern such as a BM is formed by using a Cr film or a resin film on the CF substrate 8 outside the display region 1, so that light from the backlight is shielded. FIG. 10 is a plan view of a liquid crystal display panel having a rectangular display region, and FIG. 11 is an enlarged plan view of a region C in FIG. 10.

Figure 12:
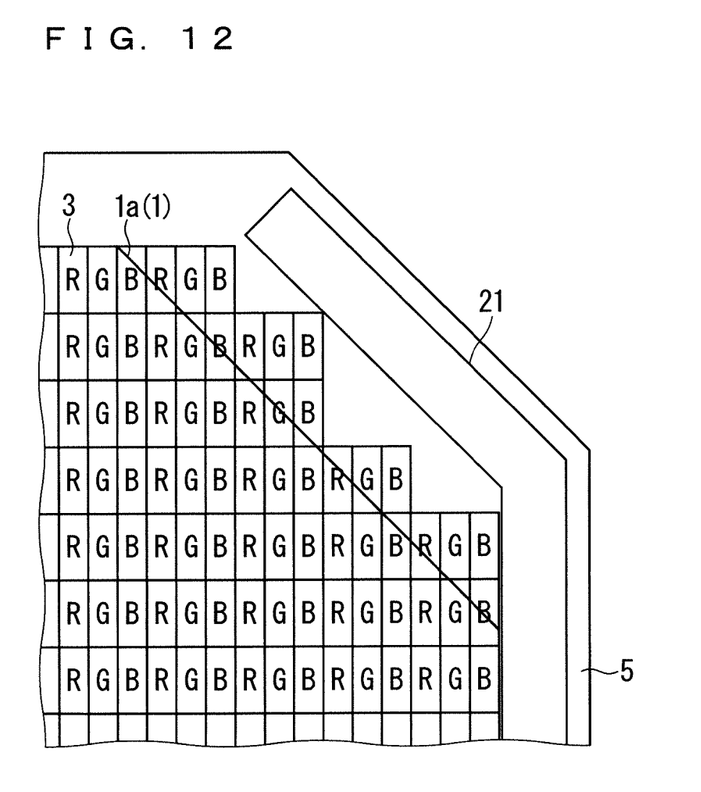
FIG. 12 is a view corresponding to FIG. 2 according to an underlying technology.

However, as illustrated in FIG. 12, if the display region 1 is formed into a non-rectangular shape, pixels 3 at a non-rectangular shape formation part 1a of the display region 1 are arrayed in a stepped pattern, by which a gap between the pixels 3 and the common line 21 is increased. Therefore, a region where the light-shielding pattern such as a BM is not formed is increased, resulting in increasing the effect of light leakage. This entails a problem of the peripheral region of the display region 1 being bright, particularly when a dark screen such as a black screen is displayed. Note that the non-rectangular shape formation part 1a is an oblique side of the hexagonal display region 1. In more general, the non-rectangular shape formation part 1a is a rectilinear oblique side in contact with the adjacent side at an angle other than a right angle, or a side which is not rectilinear. FIG. 12 is a view corresponding to FIG. 2 according to an underlying technology.

As illustrated in FIG. 2, in the liquid crystal display panel according to the first preferred embodiment, the portion of the common line 21 corresponding to the non-rectangular shape formation part 1a of the display region 1 is formed into a shape following the plurality of pixels 3 arrayed in a stepped pattern. The portion of the common line 21 corresponding to the non-rectangular shape formation part 1a of the display region 1 herein means a portion of the common line 21 facing the non-rectangular shape formation part 1a of the display region 1. When the common line 21 is formed to have the shape described above, the gap between the pixels 3 and the common line 21 is eliminated, whereby leakage of light from the backlight can be suppressed, compared to the underlying technology. Accordingly, the display quality of the liquid crystal display panel can be improved.

In addition, the size of the common line 21 is larger than that in the underlying technology, whereby low resistance can be achieved. Thus, the common potential can stably be supplied to the pixels 3, whereby the display quality of the liquid crystal display panel can be improved.

While FIG. 1 illustrates the mode for shielding light by means of the common line 21, a transfer pattern to which the same common potential is applied or a line having other potentials may be used in place of the common line 21. In addition, another pattern not involved with the application of a potential may be used, although this pattern does not provide a benefit of reducing resistance as described above.

Figure 3:
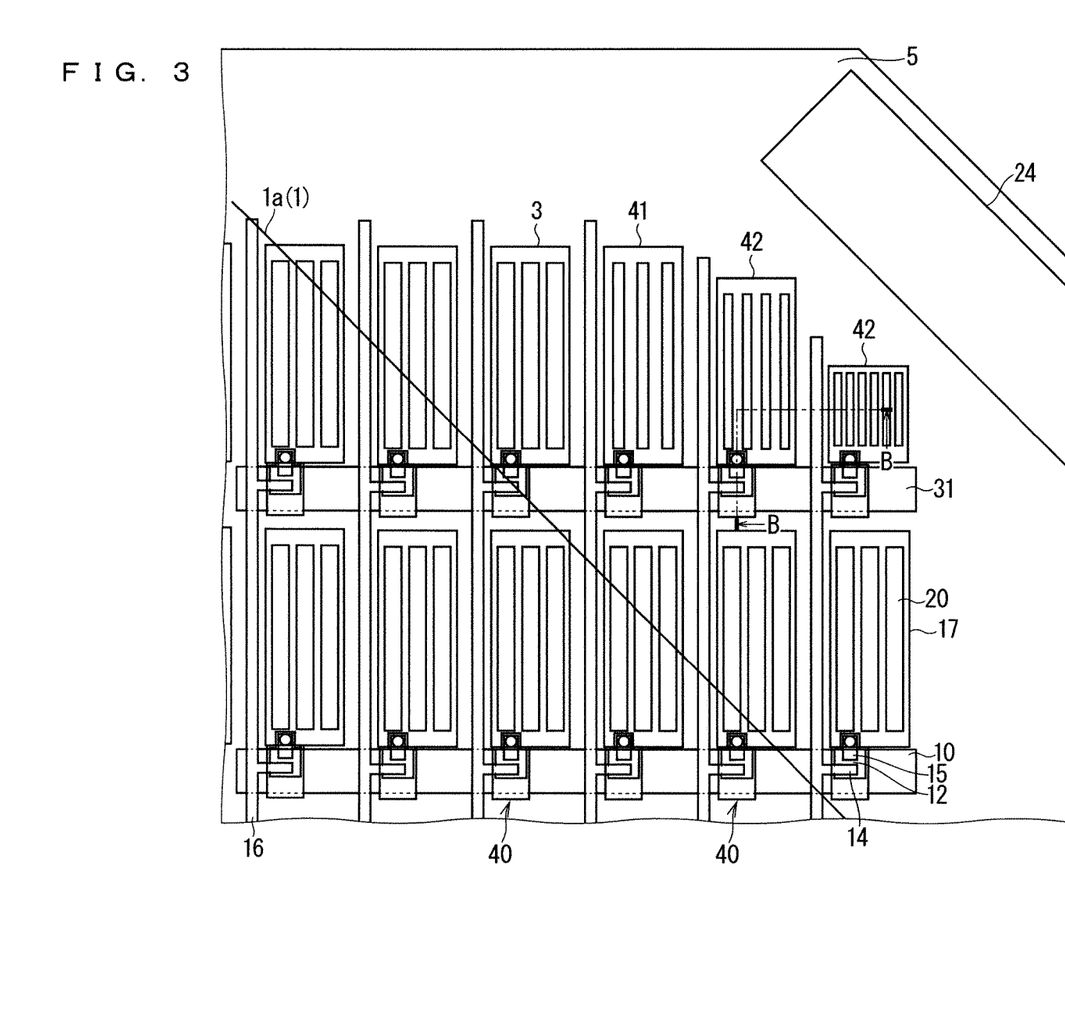
FIG. 3 is a plan view of the liquid crystal display panel for describing a manufacturing process of the liquid crystal display panel.
Figure 4:
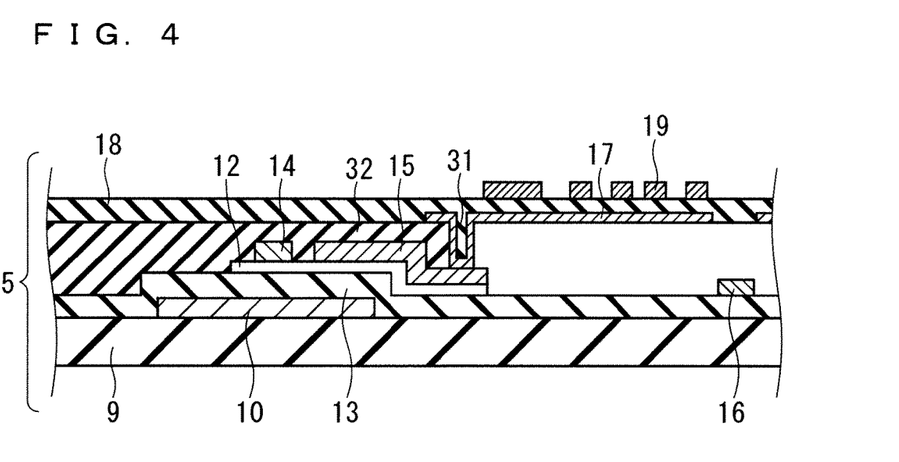
FIG. 4 is a sectional view taken along line B-B in FIG. 3.
Figure 5:
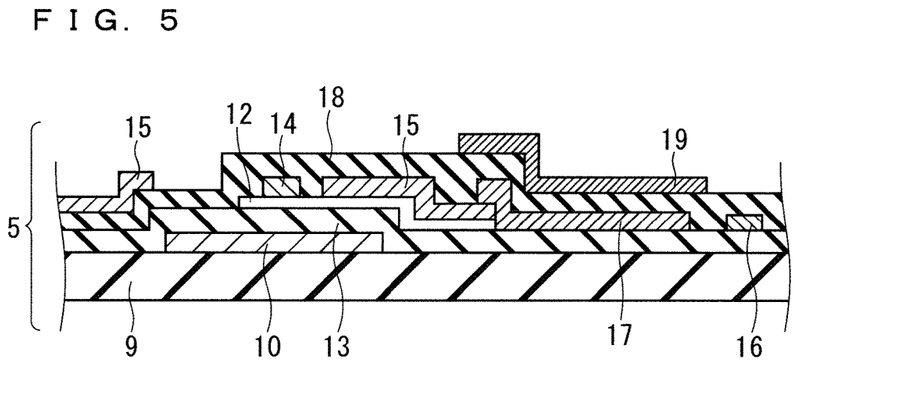
FIG. 5 is a sectional view of the liquid crystal display panel according to a mode different from the mode in FIG. 4.

Next, a manufacturing process of the TFT array substrate 5 will be described. FIG. 3 is a plan view of the liquid crystal display panel for describing a manufacturing process of the liquid crystal display panel. FIG. 4 is a sectional view taken along line B-B in FIG. 3. FIG. 5 is a sectional view of a liquid crystal display panel different from the liquid crystal display panel in FIG. 4. A manufacturing method of a liquid crystal display device of a general fringe field switching (FFS) mode will be described. However, the method is not limited thereto. FIG. 3 is also an enlarged plan view of a region C in FIG. 7 described in a third preferred embodiment, and the detail thereof will be described later.

As illustrated in FIGS. 4 and 5, a first metal film that becomes the gate line 10 is firstly formed on the insulating substrate 9 with a sputtering method using a DC magnetron. Herein, the first metal film may be formed from Mo, Cr, W, Al, or Ta, or may be an alloy film containing these metals as a main component. The thickness of the first metal film is about 0.1 µm to 0.5 µm. Then, patterning is performed to form the gate line 10. Note that, when the first metal film is patterned, the common line 21 illustrated in FIG. 1 may simultaneously be formed.

Next, a gate insulating film 13 is formed with a plasma CVD method. A silicon nitride film may be generally used for the gate insulating film 13. However, a silicon oxide film or a silicon oxynitride film may also be used.

After the gate insulating film 13 is formed, an amorphous silicon film (a-Si film) is formed with a plasma CVD method. The a-Si film generally has a laminated structure of an intrinsic semiconductor layer constituting a channel layer 12 and an impurity semiconductor layer containing phosphor or the like. The impurity semiconductor layer is formed to ensure an ohmic contact between a source electrode 14 and a drain electrode 15 described later. Then, patterning is performed to form a channel layer 12 as an island-shaped a-Si film.

Next, a second metal film is formed with a sputtering method using a DC magnetron. The second metal film may be formed from Mo, Cr, W, Al, or Ta, or may be an alloy film containing these metals as a main component. The thickness of the second metal film is about 0.1 µm to 0.5 µm. Then, patterning is performed to form the source electrode 14, the drain electrode 15, and the source line 16. In this process, to reduce a masking step, the impurity semiconductor layer for ensuring an ohmic contact between the source electrode 14 and the drain electrode 15 may be etched by using the source electrode 14 and the drain electrode 15 as a mask. Note that, when the second metal film is patterned, the common line 21 illustrated in FIG. 1 may simultaneously be formed.

As illustrated in FIG. 5, after the source electrode 14, the drain electrode 15, and the source line 16 are formed, a first transparent conductive film that becomes the pixel electrode 17 is formed with a sputtering method using a DC magnetron. The first transparent conductive film can be formed from ITO or IZO (indium zinc oxide), for example. Then, patterning is performed to form the pixel electrode 17. After the pixel electrode 17 is formed, a protection film 18 is formed with a plasma CVD method. The protection film 18 can be formed from a silicon nitride film, silicon oxide film, or silicon oxynitride film. Alternatively, to ensure insulating property by increasing thickness, an acrylic or imide organic resin film may be applied to form the protection film 18. In addition, the protection film 18 may be formed by laminating a silicon nitride film, silicon oxide film, or silicon oxynitride film and an organic resin film. Then, a contact hole (not illustrated) is formed for establishing electrical conduction with the first metal film, the second metal film, or the first transparent conductive film. Note that the organic resin film corresponds to an organic planarizing film.

In this case, a manufacturing method different from the method described above, such as a method disclosed in Japanese Patent No. 4998931, may be used. In the manufacturing method different from the method described above, after the source electrode 14 is formed, a protection film 32 is formed with a plasma CVD method, and then, the pixel electrode 17 is formed, as illustrated in FIG. 4. The protection film 32 can be formed from a silicon nitride film, silicon oxide film, or silicon oxynitride film. Alternatively, to ensure insulating property by increasing thickness, an acrylic or imide organic resin film may be applied to form the protection film 32. Then, a contact hole 31 is formed to establish electrical conduction with the first metal film or the second metal film, particularly the drain electrode 15.

In both methods described above, after the formation of the contact hole, a second transparent conductive film which becomes the common electrode 19 is formed as illustrated in FIGS. 4 and 5. The second transparent conductive film can be formed from ITO or IZO, for example. Then, patterning is performed to form the common electrode 19. A common potential is applied to the common electrode 19, and a potential which is a pixel signal is applied to the pixel electrode 17 from the source line 16. A fringe electric field is generated between the common electrode 19 and the pixel electrode 17, whereby liquid crystal molecules are driven. This is the FFS system.

Since the common potential is applied to both the common line 21 and the common electrode 19, a connection section, not illustrated, for electrically connecting both patterns may be formed between both patterns. For example, when the common line 21 is formed in the same layer as the gate line 10 in the structure illustrated in FIG. 4, the common line 21 and the common electrode 19 may be connected through a contact hole formed in the protection films 18 and 32 and the gate insulating film 13. This is not illustrated. Similarly, in the structure illustrated in FIG. 5, when the common line 21 is formed in the same layer as the gate line 10, the common line 21 and the common electrode 19 may be connected through a contact hole formed in the protection film 18 and the gate insulating film 13.

In addition, in the structure illustrated in FIG. 4, when the common line 21 is formed in the same layer as the source line 16, the common line 21 and the common electrode 19 may be connected through a contact hole formed in the protection films 18 and 32. Similarly, in the structure illustrated in FIG. 5, when the common line 21 is formed in the same layer as the source line 16, the common line 21 and the common electrode 19 may be connected through a contact hole formed in the protection film 18.

Next, the effect obtained by the liquid crystal display panel and the liquid crystal display device according to the first preferred embodiment will be described. As described above, in the liquid crystal display panel according to the first preferred embodiment, the plurality of pixels 3 are arrayed in a stepped pattern at the non-rectangular shape formation part 1*a* of the display region 1, and the portion of the common line 21 corresponding to the non-rectangular shape formation part 1*a* of the display region 1 is formed into a shape following the plurality of pixels 3 arrayed in the stepped pattern. In addition, the liquid crystal display device according to the first preferred embodiment includes a backlight and a liquid crystal display panel disposed on an emission surface side of the backlight.

Accordingly, a gap between the pixels 3 and the common line 21 can be eliminated at the non-rectangular shape formation part 1*a* of the display region 1, whereby leakage of light from the peripheral portion of the display region 1 can be suppressed. Thus, the liquid crystal display panel and the liquid crystal display device that provide satisfactory display can be implemented.

Further, the common line 21 is formed to have a larger size than the underlying technology, whereby the common line 21 can be configured to have low resistance. Thus, the common potential can be stably supplied to the pixels 3, whereby the display quality of the liquid crystal display panel and the liquid crystal display device can be improved.

While the first preferred embodiment describes the example where the display region 1 has a hexagonal shape, it is only necessary that the display region 1 has a non-rectangular shape. For example, the display region 1 may have other shapes such as a circular shape, elliptical shape, or polygonal shape other than the hexagon. This is also applied to the preferred embodiments described below.

Second Preferred Embodiment

Figure 6:
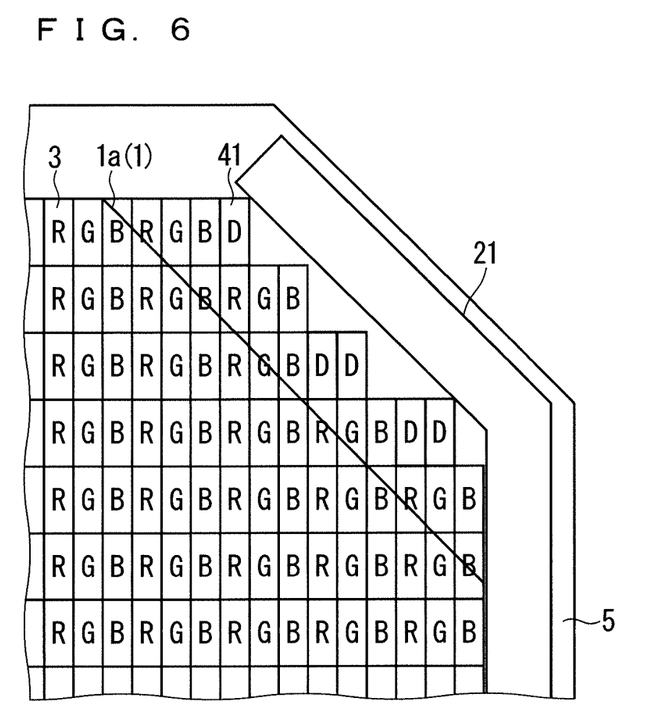
FIG. 6 is a view corresponding to FIG. 2 according to a second preferred embodiment.

Next, a liquid crystal display panel according to the second preferred embodiment will be described. FIG. 6 is a view corresponding to FIG. 2 according to the second preferred embodiment. Note that, in the second preferred embodiment, the components same as those described in the first preferred embodiment are identified by the same reference numerals, and the description thereof will be omitted.

As illustrated in FIG. 6, in the second preferred embodiment, in place of configuring the common line 21 to have a shape following the plurality of pixels 3 arrayed in a stepped pattern, a plurality of dummy pixels 41 formed by simulating the pixels 3 is disposed between the pixels 3 arrayed in a stepped pattern and the common line 21 in the peripheral region of the non-rectangular shape formation part 1*a* of the display region 1. According to this configuration, the gap between the plurality of pixels 3 arrayed in a stepped pattern and the common line 21 can be reduced. Each of the dummy pixel 41 is formed to have the same shape and the same size as the pixel 3, and is capable of shielding light from the backlight.

As described above, in the liquid crystal display panel according to the second preferred embodiment, a plurality of dummy pixels 41 formed by simulating the pixels 3 is disposed between the plurality of pixels 3 arrayed in a stepped pattern and the common line 21 in the peripheral region of the non-rectangular shape formation part 1*a* of the display region 1.

Accordingly, the gap between the plurality of pixels 3 arrayed in a stepped pattern and the common line 21 can be made smaller than the underlying technology, whereby leakage of light from the peripheral portion of the display region 1 can be suppressed. Thus, the liquid crystal display panel and the liquid crystal display device that provide satisfactory display can be implemented.

Notably, when the display region 1 is formed into a non-rectangular shape, a light-shielding pattern such as a BM may also be formed by using a Cr film or a resin film on the CF substrate 8 outside the display region 1. In this case, it is also difficult to dispose the light-shielding pattern between the plurality of pixels 3 arrayed in a stepped pattern and the common line 21 with no gap therebetween. Therefore, a plurality of dummy pixels 41 is disposed in a region where the light-shielding pattern is not formed between the plurality of pixels 3 arrayed in a stepped pattern and the common line 21 in the peripheral region of the non-rectangular shape formation part 1*a* of the display region 1. In this case, the gap between the plurality of pixels 3 arrayed in a stepped pattern and the common line 21 can also be reduced, whereby leakage of light from the peripheral portion of the display region 1 can be suppressed. Thus, the liquid crystal display panel and the liquid crystal display device that provide satisfactory display can be implemented.

Third Preferred Embodiment

Figure 7:
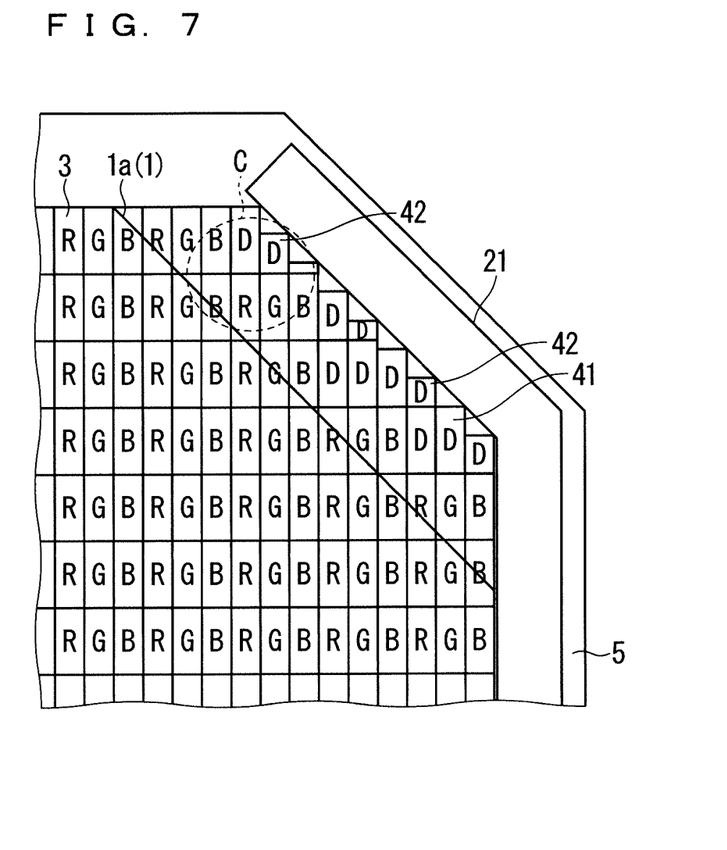
FIG. 7 is a view corresponding to FIG. 2 according to a third preferred embodiment.

Next, a liquid crystal display panel according to the third preferred embodiment will be described. FIG. 7 is a view corresponding to FIG. 2 according to the third preferred embodiment. Note that, in the third preferred embodiment, the components same as those described in the first and second preferred embodiments are identified by the same reference numerals, and the description thereof will be omitted.

As illustrated in FIG. 7, in the third preferred embodiment, some of the dummy pixels 41 and 42 are formed to have a size smaller than the size of the pixel 3.

This will be described in detail below. As illustrated in FIG. 6, even when a plurality of dummy pixels 41 is disposed between a plurality of pixels 3 arrayed in a stepped pattern and the common line 21 in the peripheral region of the non-rectangular shape formation part 1*a* of the display region 1, a gap between the dummy pixels 41 and the common line 21 cannot completely be eliminated. This is because the dummy pixel 41 is formed to have the same shape and same size as the pixel 3. In view of this, in the third preferred embodiment, dummy pixels 42 each having a size smaller than the size of the pixel 3, that is, a size smaller than the size of the dummy pixel 41, are disposed between the dummy pixels 41 and the common line 21. The dummy pixel 42 is formed by changing the size of the dummy pixel 41 for reducing the gap between the dummy pixels 41 and the common line 21. It is to be noted that, in place of disposing the dummy pixels 41, only the dummy pixels 42 may be disposed between the plurality of pixels 3 arrayed in a stepped pattern and the common line 21.

Next, the shape of the common electrode 19 in the third preferred embodiment will be described with reference to FIG. 3. FIG. 3 is an enlarged plan view of a region C in FIG. 7.

As illustrated in FIG. 3, the pixel electrode 17 is connected to each of the TFTs 40. The common electrode 19 is provided in an upper layer of each pixel electrode 17 and the source line 16 through the protection film 18 (see FIG. 4) serving as an insulating film, and drives the liquid crystal together with each pixel electrode 17. The pixel 3 includes each of the pixel electrodes 17 and each of the common electrodes 19. In the liquid crystal display device of an FFS mode, the common electrode 19 of each pixel 3 is formed to have a plurality of slits.

Because the dummy pixels 41 and 42 are formed by simulating the pixel 3 as described above, each of the dummy pixels 41 and 42 also has the pixel electrode 17 and the common electrode 19. In the liquid crystal display device of an FFS mode, the common electrodes 19 of the dummy pixels 41 and 42 are formed to have a plurality of slits. In addition, in the third preferred embodiment, the width of each of a plurality of slits 20 of the common electrodes 19 in the dummy pixels 41 and 42 is smaller than the width of each of a plurality of slits 20 of the common electrode 19 in the pixel 3. Reducing the width of each of the slits 20 of the common electrodes 19 in the dummy pixels 41 and 42 enables the capacitance between the common electrode 19 and the pixel electrode 17 to be equivalent between the pixel 3 and the dummy pixels 41 and 42. Accordingly, the electrical properties are the same between the pixel 3 and the dummy pixels 41 and 42, whereby display abnormality in the peripheral portion of the display region 1 can be suppressed.

As described above, in the liquid crystal display panel according to the third preferred embodiment, the size of at least some of the plurality of dummy pixels 41 and 42 is made smaller than the size of the pixel 3, whereby leakage of light from the peripheral portion of the display region 1 can further be suppressed, in comparison to the second preferred embodiment. Thus, the liquid crystal display panel and the liquid crystal display device that can provide more satisfactory display than the second preferred embodiment can be implemented.

Because the width of each of the plurality of slits 20 of the common electrodes 19 in the dummy pixels 41 and 42 is smaller than the width of each of the plurality of slits 20 of the common electrode 19 in the pixel 3, the capacitance between the pixel electrode 17 and the common electrode 19 can be made equivalent between the pixel 3 and the dummy pixels 41 and 42. The capacitance formed by the pixel electrodes 17 and the common electrodes 19 of the dummy pixels 41 and 42 is equivalent to the capacitance formed by the pixel electrode 17 and the common electrode 19 of the pixel 3, and therefore, the pixel 3 and the dummy pixels 41 and 42 have the same electrical properties, which enables suppression of display abnormality in the peripheral portion of the display region 1.

In addition, an organic planarizing film may be used for the protection films 18 and 32 serving as insulating films between the pixel electrode 17 and the source electrode 14 connected to the source line 16. Using the organic planarizing film can suppress parasitic capacitance between the common electrode 19 and both the source line 16 and the source electrode 14, whereby leakage of light from the peripheral portion of the display region 1 can be suppressed with display quality being maintained.

It is to be noted that the pixel electrode 17 and the common electrode 19 may be reversed in position. Specifically, the pixel electrode 17 is provided in an upper layer of each common electrode 19 and the source line 16 through the protection film 18 serving as an insulating film, and drives the liquid crystal together with each common electrode 19. The pixel 3 includes each of the pixel electrodes 17 and each of the common electrodes 19. In the liquid crystal display device of an FFS mode, each of the pixel electrodes 17 may be formed to have a plurality of slits. In this case as well, leakage of light from the peripheral portion of the display region 1 can further be suppressed than in the second preferred embodiment. Accordingly, the liquid crystal display panel and the liquid crystal display device that can provide more satisfactory display than the second preferred embodiment can be implemented.

In addition, the capacitance formed by the common electrodes 19 and the pixel electrodes 17 of the dummy pixels 41 and 42 is equivalent to the capacitance formed by the common electrode 19 and the pixel electrode 17 of the pixel 3, whereby the capacitance between the common electrode 19 and the pixel electrode 17 can be made equivalent between the pixel 3 and the dummy pixels 41 and 42. The capacitance formed by the pixel electrodes 17 and the common electrodes 19 of the dummy pixels 41 and 42 is equivalent to the capacitance formed by the pixel electrode 17 and the common electrode 19 of the pixel 3, and therefore, the pixel 3 and the dummy pixels 41 and 42 have the same electrical properties, which enables suppression of display abnormality in the peripheral portion of the display region 1.

Fourth Preferred Embodiment

Figure 8:
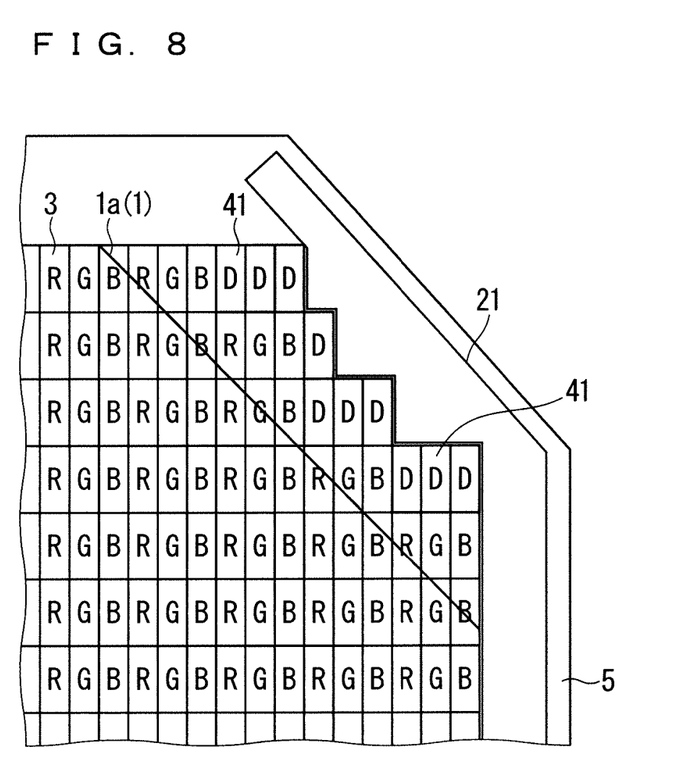
FIG. 8 is a view corresponding to FIG. 2 according to a fourth preferred embodiment.

Next, a liquid crystal display panel according to the fourth preferred embodiment will be described. FIG. 8 is a view corresponding to FIG. 2 according to the fourth preferred embodiment. Note that, in the fourth preferred embodiment, the components same as those described in the first to third preferred embodiments are identified by the same reference numerals, and the description thereof will be omitted.

As illustrated in FIG. 8, in the fourth preferred embodiment, a plurality of dummy pixels 41 is disposed between the plurality of pixels 3 arrayed in a stepped pattern and the common line 21 in the peripheral region of the non-rectangular shape formation part 1*a* of the display region 1. In addition, the portion of the common line 21 corresponding to the non-rectangular shape formation part 1*a* of the display region 1 is formed into a shape following the dummy pixels 41.

As described above, in the liquid crystal display panel according to the fourth preferred embodiment, a plurality of dummy pixels 41 is disposed between the plurality of pixels 3 arrayed in a stepped pattern and the common line 21 in the peripheral region of the non-rectangular shape formation part 1*a* of the display region 1, and the portion of the common line 21 corresponding to the non-rectangular shape formation part 1*a* of the display region 1 is formed into a shape following the plurality of dummy pixels 41.

Accordingly, leakage of light from the peripheral portion of the display region 1 can further be suppressed than in the third preferred embodiment. Thus, the liquid crystal display panel and the liquid crystal display device that can provide more satisfactory display than the third preferred embodiment can be implemented.

In the fourth preferred embodiment, it is also considered that, as in the second preferred embodiment, a light-shielding pattern such as a BM is formed by using a Cr film or a resin film on the CF substrate 8 outside the display region 1. In this case, the plurality of dummy pixels 41 may be disposed in a region where the light-shielding pattern is not formed between the pixels 3 arrayed in a stepped pattern and the common line 21 in the peripheral region of the non-rectangular shape formation part 1*a* of the display region 1. Furthermore, as in the third preferred embodiment, at least some of the dummy pixels 41 may have a size smaller than the size of the pixel 3.

Fifth Preferred Embodiment

Figure 9:
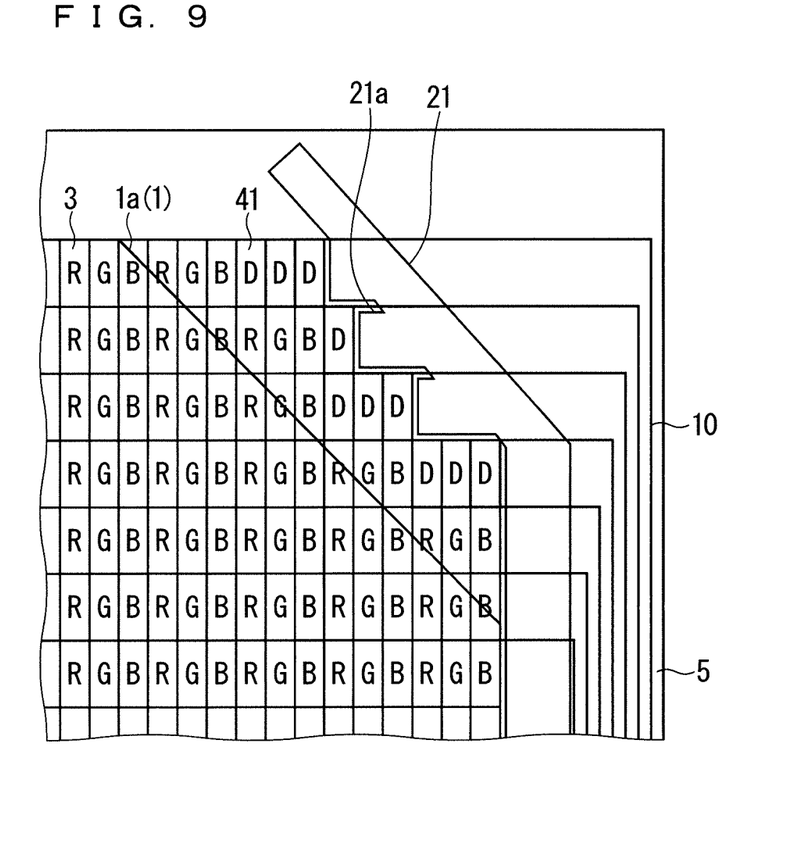
FIG. 9 is a view corresponding to FIG. 2 according to a fifth preferred embodiment.

Next, a liquid crystal display panel according to the fifth preferred embodiment will be described. FIG. 9 is a view corresponding to FIG. 2 according to the fifth preferred embodiment. Note that, in the fifth preferred embodiment, the components same as those described in the first to fourth preferred embodiments are identified by the same reference numerals, and the description thereof will be omitted.

As illustrated in FIG. 9, in the fifth preferred embodiment, a plurality of dummy pixels 41 is disposed between the plurality of pixels 3 arrayed in a stepped pattern and the common line 21 in the peripheral region of the non-rectangular shape formation part 1a of the display region 1. In addition, the portion of the common line 21 corresponding to the non-rectangular shape formation part 1a of the display region 1 is formed into a shape following the plurality of dummy pixels 41. Furthermore, the common line 21 disposed to be externally adjacent to the dummy pixels 41 has a cutout 21a on a portion of a region overlapping the gate lines 10. The cutout 21a is formed for the purpose of causing a portion of the region overlapping the gate lines 10 to be exposed. The common line 21 is not separated by the cutout 21a, thereby being capable of contributing to the supply of a common potential as in the first to fourth preferred embodiments.

In the first to fourth preferred embodiments, the common line 21 is formed in the peripheral region of the display region 1, which leads to an increase in parasitic capacitance between the gate lines 10 and the common line 21. Therefore, there arises a problem of a margin for design being narrowed for maintaining display quality. In view of this, in the fifth preferred embodiment, the cutout 21a is formed in the common line 21, which can suppress an increase in parasitic capacitance between the gate lines 10 and the common line 21. Therefore, leakage of light from the peripheral portion of the display region 1 can be suppressed with the display quality being maintained.

While FIG. 9 for describing the fifth preferred embodiment is based on FIG. 8 corresponding to the fourth preferred embodiment, the fifth preferred embodiment is applicable not only to the fourth preferred embodiment but alto to the first to third preferred embodiments. For example, even in the example where the dummy pixels are not disposed as in the first preferred embodiment, the cutout 21a can be formed in the common line 21, and the effect similar to the effect obtained by the fourth preferred embodiment can be provided.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display panel comprising:
a first substrate and a second substrate which are disposed to face each other; and
liquid crystal sealed between said first substrate and said second substrate;
said first substrate including:
an insulating substrate;
a plurality of gate lines provided on said insulating substrate;
a plurality of source lines provided on said insulating substrate so as to intersect said gate lines;
a switching element provided in each of peripheral regions of intersections of said gate lines and said source lines;
a display region in which pixels are arrayed in matrices defined by said gate lines and said source lines and which has a non-rectangular shape having a non-rectangular shape formation part; and
a common line disposed in a peripheral region of said display region for supplying a common potential to a plurality of said pixels,
wherein a plurality of said pixels is arrayed in a stepped pattern at said non-rectangular shape formation part of said display region, and
a portion of said common line between said non-rectangular shape formation part of said display region and an edge of said first substrate is formed into a shape such that one side of said common line and another side of said common line have different shapes, the one side of said common line having the same stepped pattern as edges of the plurality of said pixels arrayed in the stepped pattern and the another side of said common line having the same shape as the edge of said first substrate.

2. A liquid crystal display panel comprising:
a first substrate and a second substrate which are disposed to face each other; and
liquid crystal sealed between said first substrate and said second substrate;
said first substrate including:
an insulating substrate;
a plurality of gate lines provided on said insulating substrate;
a plurality of source lines provided on said insulating substrate so as to intersect said gate lines;
a switching element provided in each of peripheral regions of intersections of said gate lines and said source lines;
a display region in which pixels are arrayed in matrices defined by said gate lines and said source lines and which has a non-rectangular shape having a non-rectangular shape formation part; and
a common line disposed in a peripheral region of said display region for supplying a common potential to a plurality of said pixels,
wherein a plurality of said pixels is arrayed in a first stepped pattern at said non-rectangular shape formation part of said display region,
dummy pixels which are formed by simulating said pixels are disposed between the plurality of said pixels arrayed in the first stepped pattern and said common line in a peripheral region of said non-rectangular shape formation part of said display region, a plurality of said dummy pixels being arrayed in a second stepped pattern, and
a portion of said common line between said non-rectangular shape formation part of said display region and an edge of said first substrate is formed into a shape such that one side of said common line and another side of said common line have different shapes, the one side of said common line having the same stepped pattern as edges of the plurality of said dummy pixels and the another side of said common line having the same shape as the edge of said first substrate.

3. The liquid crystal display panel according to claim 2, wherein the plurality of said dummy pixels is disposed in a region where a light-shielding pattern is not formed between the plurality of said pixels arrayed in the first stepped pattern and said common line in the peripheral region of said non-rectangular shape formation part of said display region.

4. The liquid crystal display panel according to claim 2, wherein at least some of said dummy pixels are formed to have a size smaller than a size of a pixel in said display region.

5. A liquid crystal display panel of a fringe field switching mode comprising:
a first substrate and a second substrate which are disposed to face each other; and
liquid crystal sealed between said first substrate and said second substrate;
said first substrate including:
an insulating substrate;
a plurality of gate lines provided on said insulating substrate;
a plurality of source lines provided on said insulating substrate so as to intersect said gate lines;
a switching element provided in each of peripheral regions of intersections of said gate lines and said source lines;
a pixel electrode connected to each of said switching elements;
a common electrode which is provided in an upper layer of each of said pixel electrodes and said source lines through an insulating film and drives said liquid crystal together with each of said pixel electrodes;
pixels, each of which has said pixel electrode and said common electrode formed to have a plurality of slits;
a display region in which a plurality of said pixels are arrayed in matrices defined by said gate lines and said source lines and which has a non-rectangular shape having a non-rectangular shape formation part; and
a common line disposed in a peripheral region of said display region for supplying a common potential to a plurality of said pixels,
wherein a plurality of said pixels is arrayed in a stepped pattern at said non-rectangular shape formation part of said display region,
dummy pixels which are formed by simulating said pixels are disposed between the plurality of said pixels arrayed in the stepped pattern and said common line at said non-rectangular shape formation part of said display region, each dummy pixel having said pixel electrode and said common electrode formed to have a plurality of slits,
at least some of a plurality of said dummy pixels are formed to have a size smaller than the size of said pixels, and
a width of the plurality of said slits of said common electrode in said at least some of the plurality of said dummy pixels is smaller than a width of the plurality of said slits of said common electrode in said pixels.

6. A liquid crystal display panel of a fringe field switching mode comprising:
a first substrate and a second substrate which are disposed to face each other; and
liquid crystal sealed between said first substrate and said second substrate;
said first substrate including:
an insulating substrate;
a plurality of gate lines provided on said insulating substrate;
a plurality of source lines provided on said insulating substrate so as to intersect said gate lines;
a switching element provided in each of peripheral regions of intersections of said gate lines and said source lines;
a plurality of common electrodes;
a pixel electrode which is provided in an upper layer of each of said common electrodes and said source lines through an insulating film and drives said liquid crystal together with each of said common electrodes;
pixels, each of which has said common electrode and said pixel electrode formed to have a plurality of slits;
a display region in which a plurality of said pixels are arrayed in matrices defined by said gate lines and said source lines and which has a non-rectangular shape having a non-rectangular shape formation part; and
a common line disposed in a peripheral region of said display region for supplying a common potential to a plurality of said pixels,
wherein a plurality of said pixels is arrayed in a stepped pattern at said non-rectangular shape formation part of said display region,
dummy pixels which are formed by simulating said pixels are disposed between the plurality of said pixels arrayed in the stepped pattern and said common line at said non-rectangular shape formation part of said display region, each dummy pixel having said common electrode and said pixel electrode formed to have a plurality of slits,
at least some of a plurality of said dummy pixels are formed to have a size smaller than the size of said pixels, and
a width of the plurality of said slits of said pixel electrode in said at least some of the plurality of said dummy pixels is smaller than a width of the plurality of said slits of said pixel electrode in said pixels.

7. The liquid crystal display panel according to claim 5, wherein a capacitance formed by said pixel electrode and said common electrode in said dummy pixels is equivalent to a capacitance formed by said pixel electrode and said common electrode in said pixels.

8. The liquid crystal display panel according to claim 6, wherein a capacitance formed by said common electrode and said pixel electrode in said dummy pixels is equivalent to a capacitance formed by said common electrode and said pixel electrode in said pixels.

9. The liquid crystal display panel according to claim 5, wherein said common line has a cutout at a portion of a region overlapping said gate lines.

10. The liquid crystal display panel according to claim 6, wherein said common line has a cutout at a portion of a region overlapping said gate lines.

11. The liquid crystal display panel according to claim 5, wherein said insulating film between said pixel electrode and a source electrode connected to said source lines is an organic planarizing film.

12. The liquid crystal display panel according to claim 6, wherein said insulating film between said pixel electrode and a source electrode connected to said source lines is an organic planarizing film.

13. A liquid crystal display device comprising:
a light source device; and
the liquid crystal display panel according to claim 1 which is disposed on an emission surface side of said light source device.

14. A liquid crystal display device comprising:
a light source device; and
the liquid crystal display panel according to claim 2 which is disposed on an emission surface side of said light source device.

15. A liquid crystal display device comprising:
a light source device; and
the liquid crystal display panel according to claim 5 which is disposed on an emission surface side of said light source device.

16. A liquid crystal display device comprising:
a light source device; and
the liquid crystal display panel according to claim 6 which is disposed on an emission surface side of said light source device.

* * * * *